(12) United States Patent
Jeong et al.

(10) Patent No.: US 9,602,792 B2
(45) Date of Patent: Mar. 21, 2017

(54) DISPLAY DEVICE AND OPERATION METHOD THEREOF AND IMAGE DISPLAY SYSTEM

(71) Applicant: SAMSUNG DISPLAY CO., LTD., Yongin, Gyeonggi-Do (KR)

(72) Inventors: Jae-Won Jeong, Seoul (KR); Ga-Na Kim, Seoul (KR); Gyeong-Ub Moon, Suwon-si (KR); Kyung-Uk Choi, Gunpo-si (KR); Myeongsu Kim, Hwaseong-si (KR)

(73) Assignee: SAMSUNG DISPLAY CO., LTD., Yongin, Gyeonggi-do (KR)

( * ) Notice: Subject to any disclaimer, the term of this patent is extended or adjusted under 35 U.S.C. 154(b) by 0 days.

(21) Appl. No.: 14/674,159

(22) Filed: Mar. 31, 2015

(65) Prior Publication Data

US 2016/0050402 A1    Feb. 18, 2016

(30) Foreign Application Priority Data

Aug. 18, 2014    (KR) .................. 10-2014-0107156

(51) Int. Cl.

| | | |
|---|---|---|
| *G09G 3/34* | (2006.01) | |
| *H04N 9/69* | (2006.01) | |
| *G09G 3/20* | (2006.01) | |
| *H04N 17/04* | (2006.01) | |
| *H04N 5/202* | (2006.01) | |

(52) U.S. Cl.
CPC .............. *H04N 9/69* (2013.01); *H04N 17/04* (2013.01); *G09G 2320/0233* (2013.01); *G09G 2320/0673* (2013.01); *G09G 2320/0693* (2013.01); *G09G 2360/145* (2013.01); *H04N 5/202* (2013.01)

(58) Field of Classification Search
CPC .......... H04N 9/69; H04N 17/04; H04N 5/202; G09G 3/20; G09G 2320/0276; G09G 2320/0673

See application file for complete search history.

(56) References Cited

U.S. PATENT DOCUMENTS

| | | |
|---|---|---|
| 8,558,757 B2 | 10/2013 | Lee et al. |
| 8,749,711 B2 | 6/2014 | Um |

(Continued)

FOREIGN PATENT DOCUMENTS

| | | |
|---|---|---|
| JP | 07-284012 | 10/1995 |
| JP | 2011-039477 | 2/2011 |

(Continued)

*Primary Examiner* — Charles Hicks
(74) *Attorney, Agent, or Firm* — F. Chau & Associates, LLC.

(57) ABSTRACT

A display device is provided including a timing controller configured to output a test image signal, a data driver configured to output a plurality of data voltages corresponding to the test image signal; and a display panel configured to display a test image corresponding to the data voltages, wherein the timing controller includes a first processor configured to output the test image signal in response to a test signal, and a second processor configured to receive luminance information of the test image, correct a predetermined reference gamma voltage corresponding to the test image with reference to the received luminance information, and output the test signal, which corresponds to the reference gamma voltage, to the first processor.

16 Claims, 6 Drawing Sheets

(56) References Cited

U.S. PATENT DOCUMENTS

| | | | | |
|---|---|---|---|---|
| 2005/0104987 A1* | 5/2005 | Asada | ............... | H04N 5/202 |
| | | | | 348/333.01 |
| 2011/0181572 A1* | 7/2011 | Chen | ............... | G09G 3/3233 |
| | | | | 345/211 |
| 2013/0335382 A1* | 12/2013 | De Paepe | ............ | G09G 3/006 |
| | | | | 345/204 |
| 2015/0124002 A1* | 5/2015 | Horikawa | ............ | G09G 3/3607 |
| | | | | 345/690 |

FOREIGN PATENT DOCUMENTS

| | | |
|---|---|---|
| KR | 1020040041854 | 5/2004 |
| KR | 1020040072425 | 8/2004 |
| KR | 1020110027128 | 3/2011 |

\* cited by examiner

DISPLAY DEVICE AND OPERATION METHOD THEREOF AND IMAGE DISPLAY SYSTEM

CROSS-REFERENCE TO RELATED APPLICATIONS

This application claims priority under 35 U.S.C. §119 to Korean Patent Application No. 10-2014-0107156 filed on Aug. 18, 2014, in the Korean Intellectual Property Office, the disclosure of which is incorporated by reference herein.

BACKGROUND

1. Technical Field

The inventive concepts described herein relate to a display device, and more particularly, relate to a display device, an operation method thereof and an image display system for gamma correction.

2. Discussion of Related Art

Customers are steadily demanding more advanced high-quality display devices. Image quality of a display device may be improved by using luminance correction to ensure that luminance of the display device is uniform. A display device without luminance correction could cause an irregularity due to differences between luminance levels of image data even in the same gray scale thereof.

SUMMARY

At least one embodiment of the inventive concept is directed to provide a display device internally cooperating with a light measurer without an external host, an operation method thereof and an image display system.

According to an exemplary embodiment of the inventive concept, a display device includes: a timing controller configured to output a test image signal; a data driver configured to output a plurality of data voltages corresponding to the test image signal; and a display panel configured to display a test image corresponding to the data voltages. The timing controller includes: a first processor configured to output the test image signal in response to a test signal; and a second processor configured to receive luminance information of the test image, correct a predetermined reference gamma voltage corresponding to the test image with reference to the received luminance information, and output the test signal, which corresponds to the reference gamma voltage, to the first processor.

The timing controller may further include a memory configured to store information of the reference gamma voltage, and the memory may be electrically connected with the second processor.

The memory may include volatile and nonvolatile memories, and the information of the reference gamma voltage may be stored in the nonvolatile memory.

While correcting the gamma voltage, the first processor may supply the test image signal to the data driver in response to the test signal. While not correcting the gamma voltage, the first processor may supply a plurality of image signals, which are received from an external source, to the data driver.

In an exemplary embodiment of the inventive concept, an operation method of a display device performing gamma correction under control of a timing controller includes the steps of: designating a reference gamma voltage, which corresponds to a test image, from among a plurality of reference gamma voltages; outputting a test signal corresponding to the designated reference gamma voltage; outputting a test image signal in response to the test signal; generating the test image with reference to the test image signal; receiving luminance information of the test image from an external source; and correcting the designated reference gamma voltage with reference to the luminance information. The timing controller may include: a first processor configured to output the test image signal in response to the test signal; and a second processor configured to receive luminance information of the test image, correct a predetermined reference gamma voltage corresponding to the test image with reference to the received luminance information, and output the test signal, which corresponds to the designated reference gamma voltage, to the first processor.

Luminance information of the test image may be measured by an external light measurer, and the timing controller may be electrically connected with the external light measurer to receive the luminance information.

The operation method may further include the step of determining whether the external light measurer can be detected. If the second processor detects the external light measurer, the second processor may output the test signal to the first processor to generate the test image.

The operation method may further include the step of outputting an operation signal, which is for outputting light of the test image, to the external light measurer, for which the second processor responds to an external command signal.

The second processor may be an ARM core processor.

In an embodiment of the inventive concept, an image display system includes: a timing controller configured to output a test image signal; a data driver configured to output a plurality of data voltages corresponding to the test image signal; a display panel configured to display a test image corresponding to the data voltages; and a light measurer electrically connected with the timing controller, and configured to measure luminance information of the test image and output the measured luminance information to the timing controller. The timing controller may include: a first processor configured to output the test image signal in response to a test signal; and a second processor configured to receive the luminance information of the test image, correct a predetermined reference gamma voltage corresponding to the test image with reference to the received luminance information, and output the test signal, which corresponds to the reference gamma voltage, to the first processor.

The second processor may be electrically connected with the light measurer detecting light of the test image, and configured to receive the luminance information of the test image from the light measurer.

The second processor may be configured to apply an operation signal, which controls the light of the test image to be detected, to the light measurer, and the light measurer may be configured to detect the light of the test image in response to the operation signal, and measure the luminance of the test image.

The second processor may be configured to automatically detect connection with the light measurer.

If the second processor detects the light measurer, the second processor may apply the test signal, which is for generating the test image displayed on the display panel, to the first processor.

Unless the second processor detects the light measurer, the first processor may supply a plurality of image signals, which are received from an external source, to the data driver.

The second processor may be configured to apply an operation signal for detecting the light of the test image, to the light measurer in response to an external command signal.

According to an exemplary embodiment of the inventive concept, a timing controller of a display device is provided. The timing controller includes a first processor and a second processor. The first processor is configured to apply a test image signal to a data driver of the display device in response to a test signal, to display a test image on the display device. The second processor is configured to select a reference gamma voltage that corresponds to the test image, output the test signal that corresponds to the selected gamma voltage, and correct a predetermined reference gamma voltage corresponding to the test image with reference to luminance information of the test time.

The luminance information of the test image may be measured by an external light measurer. In an exemplary embodiment, when the second processor determines it is not connected to the light measurer, the second processor does not output the test signal. In an exemplary embodiment, when the second processor does not output the test signal, the first processor controls the display device to operate in a normal operation mode.

BRIEF DESCRIPTION OF THE FIGURES

The inventive concept will become apparent from the following description with reference to the following figures, wherein like reference numerals refer to like parts throughout the various figures unless otherwise specified, and wherein.

DETAILED DESCRIPTION

Figure 1:
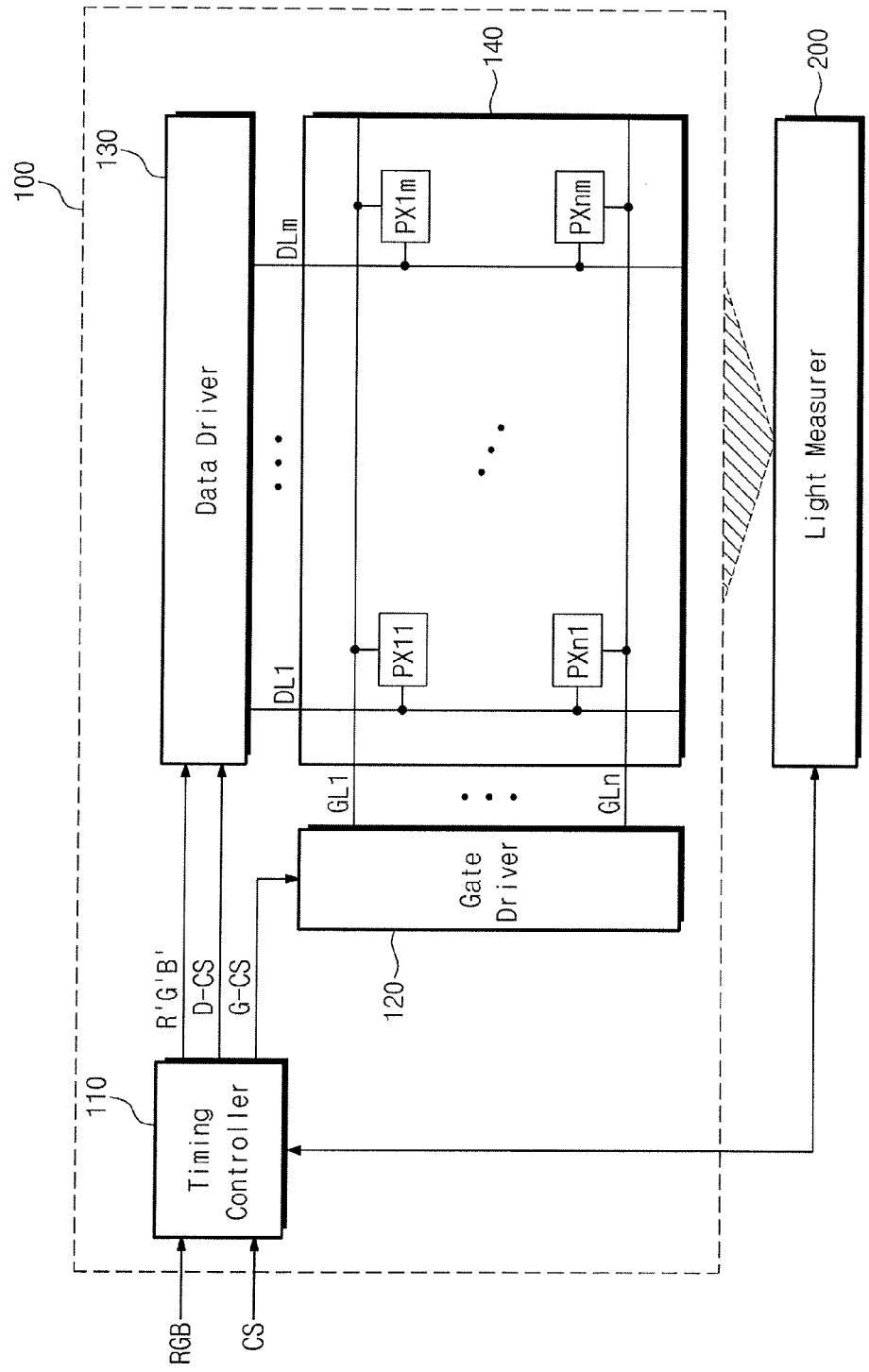
FIG. 1 is a block diagram of an image display system according to an exemplary embodiment of the inventive concept.

Embodiments of the inventive concept will be described in detail with reference to the accompanying drawings. The inventive concept, however, may be embodied in various different forms, and should not be construed as being limited only to the illustrated embodiments. Rather, these embodiments are provided as examples so that this disclosure will be thorough and complete, and will fully convey the concept of the inventive concept to those skilled in the art. Unless otherwise noted, like reference numerals denote like elements throughout the attached drawings and written description, and thus descriptions will not be repeated. In the drawings, the sizes and relative sizes of layers and regions may be exaggerated for clarity.

As used herein, the singular forms "a", "an" and "the" are intended to include the plural forms as well, unless the context clearly indicates otherwise. It will be understood that when an element or layer is referred to as being "on", "connected to (or with)", "coupled (up) to", or "adjacent to" another element or layer, it can be directly on, connected, coupled, or adjacent to the other element or layer, or intervening elements or layers may be present.

Now hereinafter will be described exemplary embodiments of the inventive concept in conjunction with accompanying drawings.

FIG. 1 is a block diagram of an image display system according to an exemplary embodiment of the inventive concept.

Referring to FIG. 1, the image display system includes a display device 100 and a light measurer 200. A light meter is an example of the light measurer 200.

The display device 100 includes a timing controller 110, a gate driver 120, a data driver 130, and a display panel 140.

The timing controller 110 receives pluralities of image signals RGB and control signals CS from an external source. The timing controller 110 converts data formats of the image signals RGB into new Image signals R'G'B' that are suitable for interfacing with the data driver 130. The new Image signals R'G'B' are supplied to the data driver 130.

Additionally, the timing controller 110 generates a data control signal D-CS and a gate control signal G-CS in response to the control signals CS. Exemplarily, the data control signal D-CS may include an output start signal, a horizontal start signal, etc. The gate control signal G-CS may include a vertical start signal and a vertical clockbar signal. The timing controller 110 applies the data control signal D-CS to the data driver 130, while supplying the gate control signal G-CS to the gate driver 120.

In an exemplary embodiment, the timing controller 110 is electrically connected with the light measurer 200. The timing controller 110 and the light measurer 200 may cooperate with each other. The light measurer 200 uses optical characteristics to measure luminance information of an image which appears on the display panel 200. In an embodiment, the light measurer 200 detects lights from the display panel 200 and determines the luminance information from the detected light. The timing controller 110 is capable of receiving a detection signal, which contains the luminance information of the image, from the light measurer 200.

Additionally, the timing controller 110 is capable of wholly controlling an operation of the light measurer 200. While the light measurer 200 can be controlled by an external host, the timing controller 110 according to an exemplary embodiment of the inventive concept uses an internal processor for controlling the light measurer 200. Thus the timing controller 110 can cooperate with the light measurer 200 without requiring an additional external host. An interrelated operation between the timing controller 110 and the light measurer 200 will be explained in more detail later in conjunction with FIGS. 2 and 3.

The gate driver 120 sequentially outputs gate signals in response to the gate control signal G-CS which is applied from the timing controller 110. A plurality of pixels PX11~PXnm included in the display panel 140 may be scanned by rows and in sequence under control of the gate signals.

The data driver 130 converts the image signals R'G'B', which were previously changed in data format, into a plurality of data voltages in response to the data control signal D-CS applied from the timing controller 110. The data driver 130 outputs the data voltages to the display panel 140.

The display panel 140 includes a plurality of gate lines GL1~GLn and a plurality of data lines DL1~DLm. The gate lines GL1~GLn may be arranged to extend along a row direction and intersect the data lines DL1~DLm extending along a column direction. The data lines DL1~DLm are electrically connected with the data driver 130, and the data lines DL1~DLm receive the data voltages. Each of the pixels PX11~PXnm is connected with a gate line (e.g. GLn) and a data line (e.g. DLm).

A process of fabricating the display device may include a step of correcting distribution profiles or deviations which arise from pixels. In other words, gamma correction may be performed during the fabrication process of the display device.

The display device 100 according to an exemplary embodiment of the inventive concept performs the gamma correction using the timing controller 110. The timing controller 110 may be electrically connected with the light measurer 200, which is located outside the display device 100. The light measurer 200 may detect light from the display panel 140 that is presenting a test image. The light measurer 200 generates luminance information of the test image using the detected light. Then the light measurer 200 may apply a detection signal, which contains the luminance information of the test image, to the timing controller 110.

The light measurer 200 may determine information about the optical characteristics of the display panel 140. The information is not limited to luminance of emission, and may include contents for color coordinates, curves of the gamma characteristics, etc. This information about the optical characteristics for the test image of the display panel 140 may be transferred to the timing controller 110 and used in optical correction of images.

Figure 2:
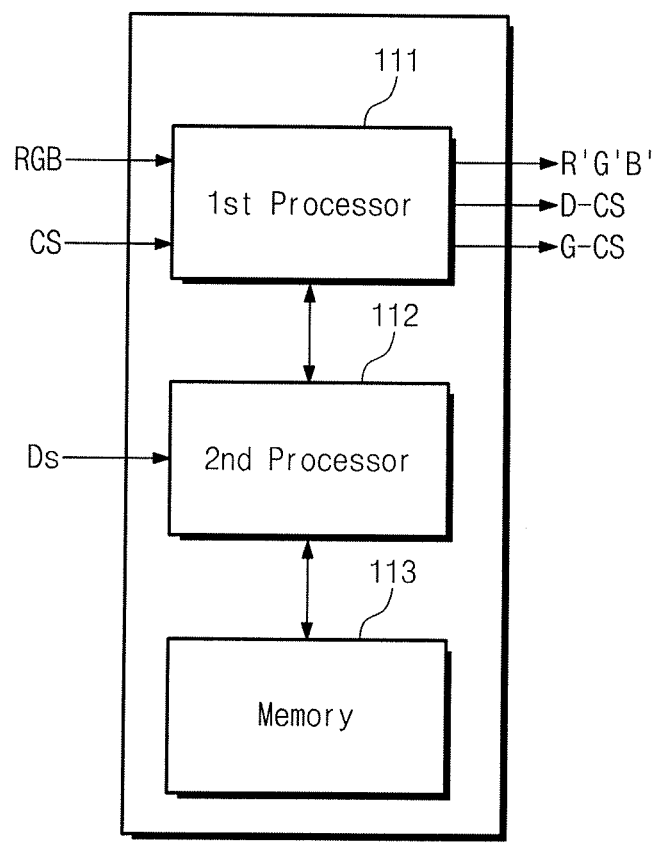
FIG. 2 is a block diagram illustrating a timing controller shown in FIG. 1 according to an exemplary embodiment of the inventive concept.

FIG. 2 is a block diagram illustrating the timing controller 110 shown in FIG. 1 according to an exemplary embodiment of the inventive concept.

Referring to FIGS. 1 and 2, the timing controller 110 includes a first processor 111, a second processor 112, and a memory 113. In an exemplary embodiment, the first processor 111, the second processor 112 and the memory 113 are embedded into a single chip.

The first processor 111 controls the overall operation of displaying images on the display panel 140. For example, the first processor 111 is electrically connected with the gate driver 120 and the data driver 130. The first processor 111 outputs the gate control signal G-CS, the data control signal D-CS and the image signals R'G'B'. Additionally, the first processor 111 is electrically connected with the second processor 112. The first processor 111 may receive a control signal, which is used for the gamma correction, from the second processor 112. The first processor 111 is configured to control an operation of the display device 100.

The second processor 112 may control an operation of the light measurer 200 in electrical connection with the light measurer 200 (refer to FIG. 1). In an embodiment, the second processor 112 is implemented by an ARM core processor. The ARM core processor is a kind of integrated circuit, built into the timing controller 110, and capable of controlling an overall operation of the light measurer 200. Additionally, the second processor 112 operates in connection with the first processor 111, and is capable of controlling the first processor 111 to present the test image on the display panel 140.

The memory 113 is electrically connected with the second processor 112 and may include volatile and nonvolatile memory devices. The nonvolatile memory may store a booting program for starting up the second processor 112, and reference luminance information of the pixels. Exemplarily, the nonvolatile memory may be implemented in a flash memory or a magnetic RAM. The volatile memory may be implemented in a memory of sync DRAM series, capable of reserving for an operation of the second processor 112 temporarily.

As disclosed below, the timing controller 110 according to an exemplary embodiment of the inventive concept includes the second processor 112, which may be directly connected with the light measurer 200 and control an operation of the light measurer 200. Therefore, even if there is a product change to the light measurer 200, it is possible to control an operation of the modified light measurer 200 by way of updating software included in the second processor 112. Although this embodiment is described as the second processor 112 controlling an operation of the light measurer 200, the inventive concept is not limited thereto. The second processor 112 may control other operations of the first processor 111, as well as control the gamma correction.

Figure 3:
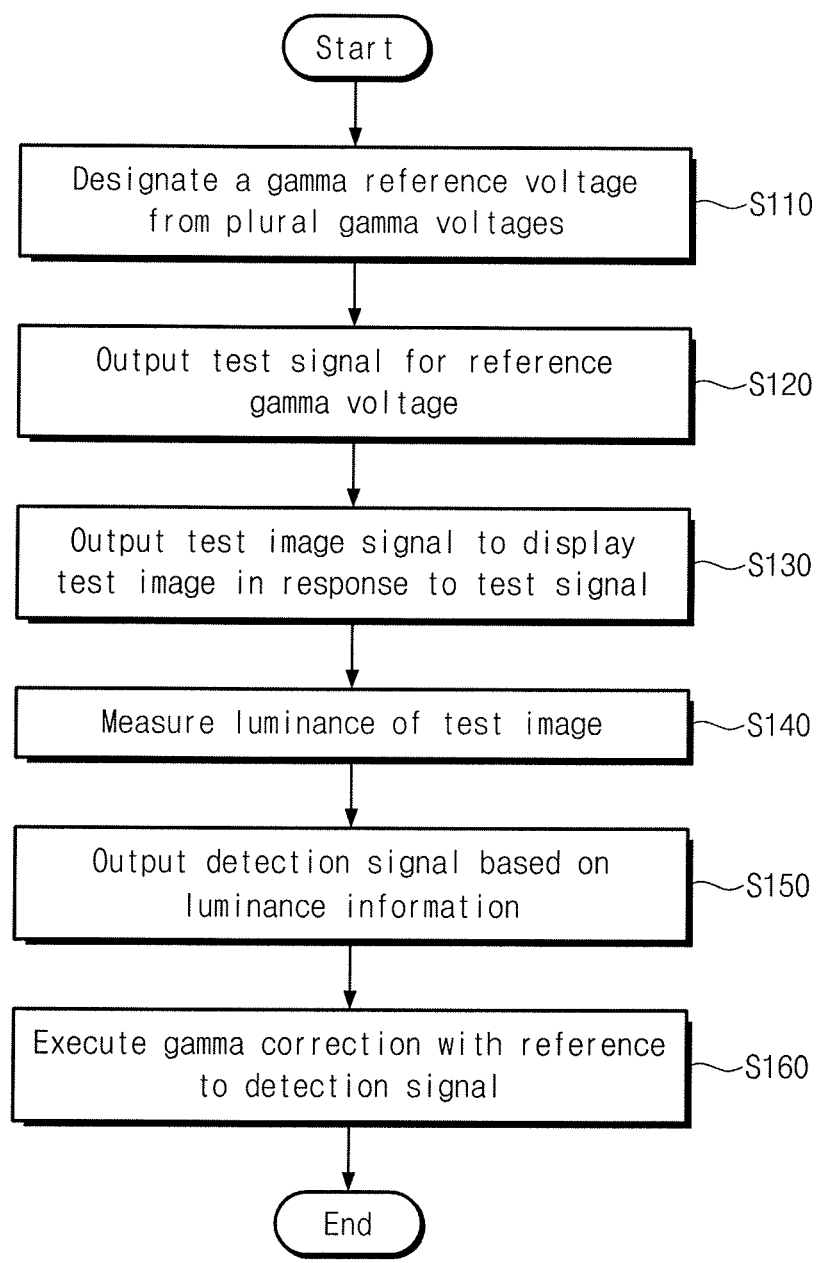
FIG. 3 is a flow chart showing an operation of the timing controller for gamma correction according to an exemplary embodiment of the inventive concept.

FIG. 3 is a flow chart showing an operation of the timing controller for the gamma correction according to an exemplary embodiment of the inventive concept.

Referring to FIGS. 2 and 3, at step S110, the second processor 112 designates one reference gamma voltage, corresponding to a test image, from among a plurality of gamma voltages. As an example, the test image may be formed with white gray scale image data. Additionally, data corresponding to the plural gamma voltages necessary for displaying the test image may be stored in the memory 113.

At step S120, the second processor 112 outputs a test signal, which corresponds to the reference gamma voltage, to the first processor 111 in order to display the test image.

At step 130, the first processor 111 applies a test image signal, which is for displaying the test image, to the data driver 130 (refer to FIG. 1) in response to the test signal. The data driver 130 responds to the test image signal to supply data voltages, which correspond to the reference gamma voltage, to the display panel 140 (see FIG. 1). Then the display panel 140 presents the test image in response to the data voltages corresponding to the reference gamma voltage.

At step S140, the light measurer 200 (refer to FIG. 1) detects light of the test image presented on the display panel 140 under control of the second processor 112. In an exemplary embodiment, the second processor 112 applies an operation signal to the light measurer 200 that causes the light measurer 200 to operate to detect the light and measure luminance from the detected light. The light measurer 200 may detect the test image in response to the operation signal.

In more detail, the light measurer 200 detects light of the test image, which is presented on the display panel 140, and converts the detected light into an electrical signal. Based on a detection result, the light measurer 200 obtains luminance of the test image. Then, at step S150, the light measurer 200 supplies the luminance information of the test image as the detection signal Ds to second processor 112.

At step S160, the second processor 112 performs the gamma correction with reference to the detection signal Ds which is received from the light measurer 200. For example, the detection signal Ds indicates the luminance information of the test image. Exemplarily, on the basis of a full white gray scale, the second processor 112 compares gray scales between the reference gamma voltage and the test image. The second processor 112 corrects the gray scale of the reference gamma voltage in accordance with a result of the comparison.

Figure 4:
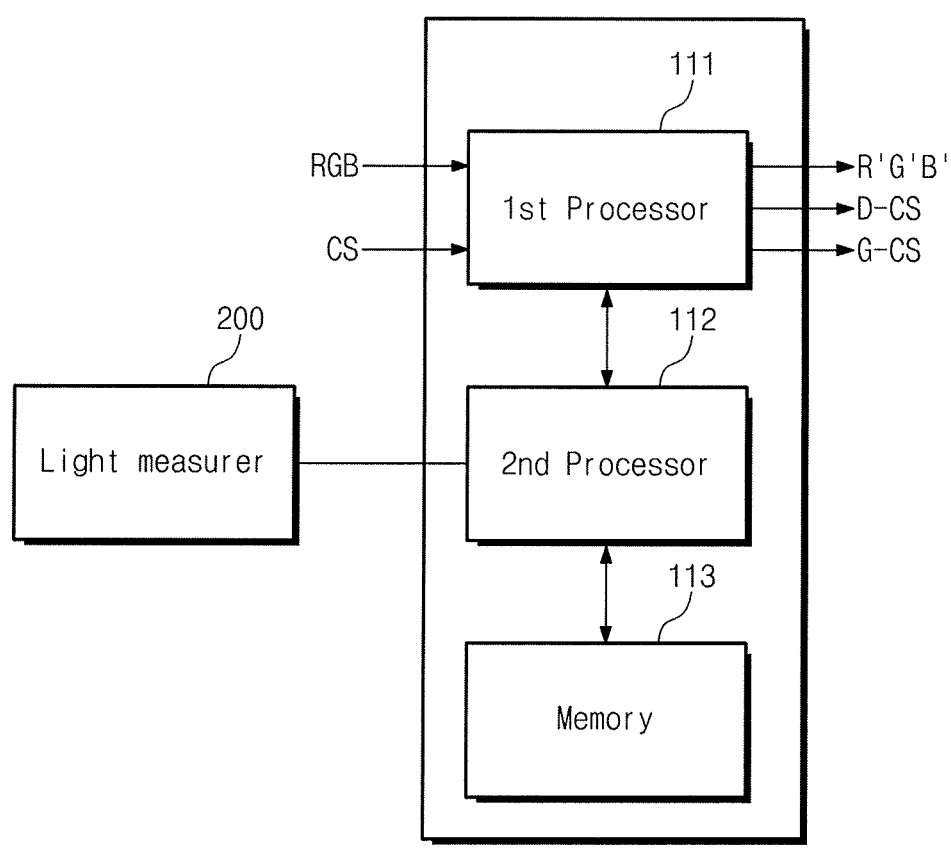
FIG. 4 is a block diagram showing an cooperative function with the timing controller and a light measurer shown in FIG. 1.

FIG. 4 is a block diagram showing a cooperative function with the timing controller and the light measurer shown in FIG. 1.

Referring to FIG. 4, the light measurer 200 is electrically connected with the timing controller 110. In an embodiment, the light measurer 200 is electrically connected with the second processor 112, and detects light of the test image under control of the second processor 112.

In an exemplary embodiment, the second processor 112 executes the operation of gamma correction in accordance with first and second gamma correction modes.

In an embodiment, during the first gamma correction mode, the second processor 112 controls the gamma correction to be automatically executed in accordance with a result of the detection by the light measurer 200.

In an embodiment, during the second gamma correction mode, the second processor 112 controls the gamma correction to be executed in response to an external command signal.

Figure 5:
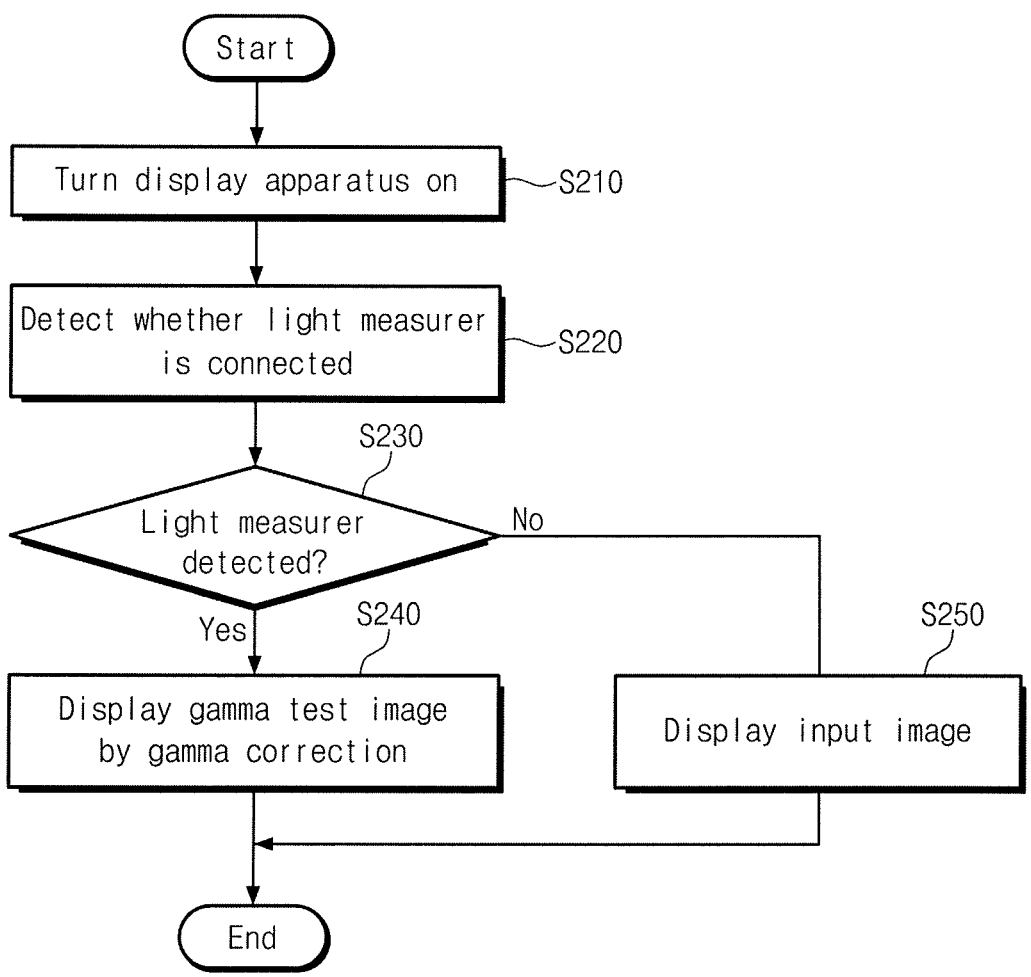
FIG. 5 is a flow chart showing an operation during a first gamma correction mode according to an exemplary embodiment of the inventive concept.

FIG. 5 is a flow chart showing an operation during the first gamma correction mode according to an exemplary embodiment of the inventive concept.

Referring to FIGS. 1 and 5, at step S210, the display device 100 is turned on (e.g., by an external power supply). Then components of the display device 100 can be conditioned to be operative.

At step S220, after being turned on (e.g., by the external power supply), the second processor 112 begins detecting a connection state with the light measurer 200. For example, after an operation of the display panel 140, the second processor 112 detects whether it is electrically connected with the light measurer 200.

If the second processor 112 is electrically connected with the light measurer 200 (Yes) at step S230, the second processor 112 controls a test image of the gamma correction to be presented on the display panel 140 (S240). Afterwards, the second processor 112 may perform the gamma correction aforementioned above by FIG. 3.

If the second processor 112 is not electrically connected with the light measurer 112 (No) at step S230, the second processor 112 does not output a test signal for the gamma correction. That is, the first processor 111 controls the display device 100 in a normal operation mode to display an external input image which is not provided in the gamma correction mode. As a result, based on image signals supplied from an external source, the input image is presented on the display panel 140.

Figure 6:
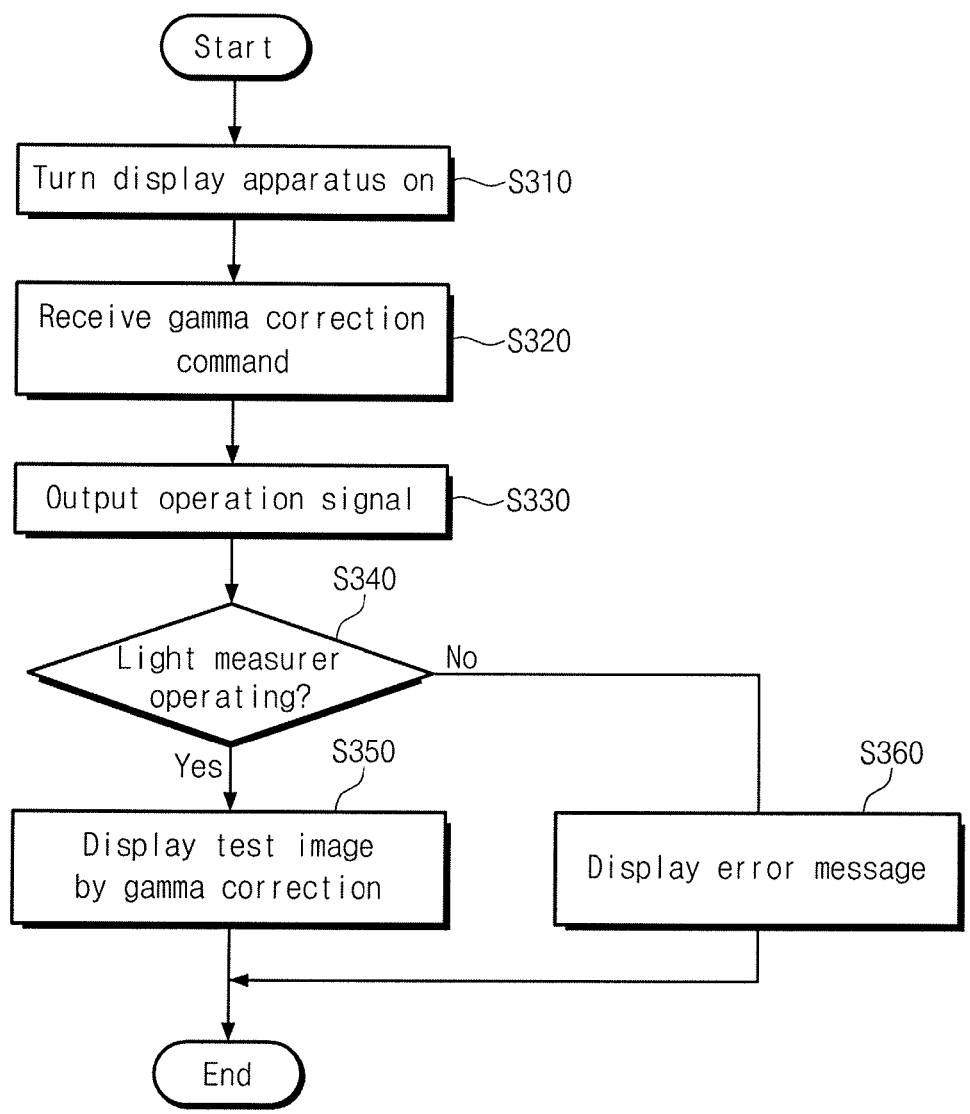
FIG. 6 is a flow chart showing an operation during a second gamma correction mode according to an exemplary embodiment of the inventive concept.

FIG. 6 is a flow chart showing an operation during the second gamma correction mode according to an exemplary embodiment of the inventive concept.

Referring to FIGS. 1 and 6, at step S310, the display device 100 is turned on by external power supply. Then components of the display device 100 can be conditioned to be operative.

At step S320, the second processor 112 receives a gamma correction command from an external source. In this case, the light measurer 200 is described as being electrically connected with the second processor 112.

At step S330, the second processor 112 responds to the gamma correction command to output an operation signal to determine whether the light measurer 200 is normally operating.

If at step S340 the light measurer 200 is determined to be normally operating (Yes), the second processor 112 controls a test image, which accords to the gamma correction, to be presented on the display panel 140 (S350). Afterward, the second processor 112 may begin the gamma correction aforementioned by FIG. 3.

If at step S340 the light measurer 200 is determined not to be operating normally (No), the second processor 112 does not output a test signal for the gamma correction. In this case, the second processor 112 outputs an error signal at step S360. The first processor 111 may control an error message to be presented through the display panel 140.

While the second processor 112 is described as making the error message that is presented on the display panel 140 when the light measurer 200 is not operating normally, the inventive concept is not limited thereto. For example, when the light measurer 200 is not operating normally (No), the first processor 111 may control the display device 100 in a normal operation mode to display an external input image which is not provided in the gamma correction mode.

According to the aforementioned embodiments of the inventive concept, it is possible for the display device to cooperate with the light measurer without any external host. Further, the display device is capable of internally controlling the light measurer through the timing controller, by itself, and not through an external host. Therefore, even if the light measurer is changed in specifications, the gamma correction is still operative by means of software updates in the display device. As the gamma correction can be performed even without an external host, it is possible to reduce the whole time dissipation and a cost for the external host.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A display device comprising:
    a timing controller configured to output a test image signal and receive a plurality of image signals from an external source;
    a data driver configured to output a plurality of data voltages corresponding to the test image signal; and
    a display panel configured to display a test image corresponding to the data voltages,
    wherein the timing controller comprises:
        a first processor configured to output the test image signal in response to a test signal and receive the image signals; and
        a second processor configured to receive luminance information of the test image, determine a grayscale of the test image based on the luminance information, compare the grayscale of the test image with a grayscale of a predetermined reference gamma voltage, correct the predetermined reference gamma voltage using a result of the compare, and output the test signal, which corresponds to the predetermined gamma voltage, to the first processor.

2. The display device according to claim 1, wherein the timing controller further comprises a memory configured to store information of the reference gamma voltage, wherein the memory is electrically connected with the second processor.

3. The display device according to claim 2, wherein the memory comprises volatile and nonvolatile memories, wherein the information of the reference gamma voltage is stored in the nonvolatile memory.

4. The display device according to claim 1, wherein while correcting the gamma voltage, the first processor supplies the test image signal to the data driver in response to the test signal, wherein while not correcting the gamma voltage, the first processor supplies the image signals to the data driver.

5. An operation method of a display device performing gamma correction under control of a timing controller comprising first and second processors, the operation method comprising:
   designating, by the second processor, a reference gamma voltage, which corresponds to a test image, from among a plurality of reference gamma voltages;
   outputting, by the second processor, a test signal corresponding to the designated reference gamma voltage to the first processor;
   outputting, by the first processor, a test image signal in response to the test signal;
   presenting, by the display device, the test image with reference to the test image signal;
   determining, by the second processor, a grayscale of the test image based on luminance information of the test image received from an external source;
   comparing, by the second processor, the grayscale of the test image with a grayscale of the designated reference gamma voltage; and
   correcting, by the second processor, the designated reference gamma voltage using a result of the comparing.

6. The operation method according to claim 5, wherein the external source is an external light measurer that measures luminance of the test image and the timing controller is electrically connected with the external light measurer to receive the luminance information that is based on the measured luminance.

7. The operation method according to claim 6, further comprising:
   determining, key the second processor whether the external light measurer is detectable; and
   outputting, by the second processor, the test signal to the first processor to generate the test image when the external light measurer is detectable.

8. The operation method according to claim 6, further comprising:
   outputting, by the second processor an operation signal to the external light measurer,
   wherein the operation signal causes the external light measurer to operate to detect light of the test image.

9. The operation method according to claim 6, wherein the second processor is a RISC core processor.

10. An image display system comprising:
    a timing controller configured to output a test image signal and receive a plurality of image signals from an external host;
    a data driver configured to output a plurality of data voltages corresponding to the test image signal;
    a display panel configured to display a test image corresponding to the data voltages; and
    a light measurer configured to measure luminance of the test image to generate luminance information and output the luminance information,
    wherein the timing controller comprises:
      a first processor configured to output the test image signal in response to a test signal and receive the image signals; and
      a second processor configured to receive the luminance information of the test image, correct a predetermined reference gamma voltage corresponding to the test image with reference to the received luminance information,
    wherein the second processor is configured to detect a connection with the light measurer,
    wherein the second processor is configured to output the test signal, which corresponds to the predetermined reference gamma voltage, to the first processor, when the connection is detected, and
    wherein the first processor controls the display panel to display an image not used for gamma correction when the connection is not detected.

11. The image display system according to claim 10, wherein the second processor is electrically connected with the light measurer detecting light of the test image, and configured to receive the luminance information of the test image from the light measurer, when the connection is detected.

12. The image display system according to claim 11, wherein the second processor is configured to apply an operation signal to the light measurer, wherein the light measurer is configured to detect the light of the test image in response to the operation signal, and measure the luminance of the test image.

13. The image display system according to claim 11, wherein the second processor is configured to automatically detect the connection with the light measurer.

14. The image display system according to claim 10, wherein the first processor supplies the image signals to the data driver when the connection is not detected.

15. The image display system according to claim 11, wherein the second processor is configured to apply an operation signal for detecting the light of the test image, to the light measurer in response to an external command signal.

16. The image display system according to claim 10, wherein the second processor is configured to select a reference gamma voltage that corresponds to the test image, output the test signal that corresponds to the selected gamma voltage, and correct the predetermined reference gamma voltage corresponding to the test image with reference to the luminance information of the test image.

* * * * *